US006892949B2

(12) United States Patent
Mondie

(10) Patent No.: US 6,892,949 B2
(45) Date of Patent: May 17, 2005

(54) LOW VISUAL IMPACT LABELING METHOD AND SYSTEM

(75) Inventor: George R. Mondie, Bedford, TX (US)

(73) Assignee: Siemens Logistics and Assembly Systems Inc., Arlington, TX (US)

( * ) Notice: Subject to any disclaimer, the term of this patent is extended or adjusted under 35 U.S.C. 154(b) by 96 days.

(21) Appl. No.: 10/033,735

(22) Filed: Dec. 28, 2001

(65) Prior Publication Data

US 2002/0130182 A1 Sep. 19, 2002

Related U.S. Application Data

(60) Provisional application No. 60/258,986, filed on Dec. 29, 2000.

(51) Int. Cl.[7] ................................................ G06K 19/06

(52) U.S. Cl. ........................................ 235/491; 235/468

(58) Field of Search ................................ 235/491, 468, 235/472.01, 462.04, 462.05, 375, 383, 462.36, 380; 283/92; 359/487, 485; 353/20

(56) References Cited

U.S. PATENT DOCUMENTS 2,281,101 A 4/1942 Land ............................ 88/29
2,440,105 A 4/1948 Land et al. .................... 88/65
3,899,687 A 8/1975 Jones ......................... 250/568
4,133,775 A * 1/1979 Bloom ....................... 252/585
4,260,881 A * 4/1981 Peterson ..................... 235/493
4,544,836 A 10/1985 Galvin et al. ............... 235/487
4,809,340 A 2/1989 Mersereau ..................... 382/1
4,845,761 A 7/1989 Cate et al. ..................... 382/1
4,906,829 A * 3/1990 Iseli .......................... 235/454
5,073,954 A 12/1991 Van Tyne et al. ............. 382/18
5,173,381 A 12/1992 Natansohn et al. ........... 430/19
5,177,346 A 1/1993 Chisholm ................... 235/462
5,237,164 A * 8/1993 Takada ....................... 235/487
5,284,364 A 2/1994 Jain ............................ 283/87

(Continued)

FOREIGN PATENT DOCUMENTS

WO WO 93/00224 1/1993 ........... B42D/15/10

*Primary Examiner*—Thien M. Le
*Assistant Examiner*—Allyson N Trail
(74) *Attorney, Agent, or Firm*—Philip G. Meyers

(57) ABSTRACT

A method of forming symbols, characters, and other images from a light polarizing material including machine readable indicia enabling automated identification of articles is disclosed. A light polarizing material is applied over a reflective layer in a machine readable pattern. The material may be an image imprinted on a label with a light polarizing material on a substrate such as a transparent oriented film. In one aspect, a mail processing system includes a computer including a database of destination codes corresponding to a plurality of mail pieces for delivery to at least some of the destination codes. A media applicator utilizes the database for generating and applying a light polarizing material to a label or article to form a machine readable indicia, including the destination code for each of the plurality of mail pieces. A mail sorting system utilizing the label includes a camera with polarized lenses for filtering light reflected from indicia formed from a light polarizing material on the label. A detector associated with each of the lenses for detecting reflected light and generating a signal in response thereto. Signals from the detector are compared by a computer that produces an electronic image or pattern corresponding to the machine readable indicia and generates a sorting signal based upon the indicia which is transmitted to a mail sorter where the mail pieces are sorted.

15 Claims, 13 Drawing Sheets

U.S. PATENT DOCUMENTS

| | | | | | |
|---|---|---|---|---|---|
| 5,317,654 | A | | 5/1994 | Perry et al. | 382/61 |
| 5,363,967 | A | | 11/1994 | Tilles et al. | 209/539 |
| 5,430,278 | A | * | 7/1995 | Krieg et al. | 235/449 |
| 5,438,403 | A | | 8/1995 | Hoshino et al. | 356/71 |
| 5,543,608 | A | | 8/1996 | Rantalainen | 235/454 |
| 5,545,886 | A | * | 8/1996 | Metlitsky et al. | 235/462.42 |
| 5,629,512 | A | * | 5/1997 | Haga | 235/468 |
| 5,636,292 | A | * | 6/1997 | Rhoads | 382/232 |
| 5,706,133 | A | * | 1/1998 | Orensteen et al. | 359/530 |
| 5,744,815 | A | * | 4/1998 | Gurevich et al. | 250/566 |
| 5,959,296 | A | * | 9/1999 | Cyr et al. | 250/271 |
| 6,013,123 | A | | 1/2000 | Scarpetti | 106/31.27 |
| 6,024,455 | A | * | 2/2000 | O'Neill et al. | 359/530 |
| 6,124,970 | A | | 9/2000 | Karassev et al. | 359/485 |
| 6,129,280 | A | * | 10/2000 | De Renzis et al. | 235/462.22 |
| 6,168,080 | B1 | * | 1/2001 | Verschuur et al. | 235/462.01 |
| 6,311,892 | B1 | * | 11/2001 | O'Callaghan et al. | 235/375 |
| 6,325,515 | B1 | * | 12/2001 | Coderre et al. | 359/530 |
| 6,350,034 | B1 | * | 2/2002 | Fleming et al. | 359/529 |
| 6,446,865 | B1 | * | 9/2002 | Holt et al. | 235/382 |
| 6,542,083 | B1 | * | 4/2003 | Richley et al. | 340/825.49 |
| 6,542,259 | B1 | * | 4/2003 | Andersen et al. | 358/1.9 |
| 2001/0001472 | A1 | * | 5/2001 | Sano et al. | 235/462.01 |
| 2001/0036013 | A1 | * | 11/2001 | Allen et al. | 359/599 |
| 2002/0031783 | A1 | * | 3/2002 | Empedocles et al. | 435/7.1 |
| 2003/0121978 | A1 | * | 7/2003 | Rubin et al. | 235/462.1 |

* cited by examiner

LOW VISUAL IMPACT LABELING METHOD AND SYSTEM

This application claims priority of U.S. Provisional Patent Application Ser. No. 60/258,986, filed Dec. 29, 2000.

TECHNICAL FIELD

The present invention relates to the field of article identification methods and systems, and particularly to a label, system and method that provides a means of coding articles for identification, sorting and processing with minimal visual impact.

BACKGROUND OF THE INVENTION

The system and method according to the invention may be advantageously applied in a variety of contexts where it is desired to label articles for identification with minimal impact on the appearance of the articles, for example items that have been specially wrapped for presentation, articles having critical information printed on an exterior surface, decorative items and the like. Another application in which the system and method of the invention may be advantageously utilized is in connection with mail piece labeling for automated processing.

Modern postal services, for example, the U.S. Postal Service, handle massive volumes of mail pieces on a daily basis. Consequently, automated handling and sorting equipment is employed whenever and wherever possible to facilitate the sorting, processing and distribution of mail pieces. Such systems have been proven extremely effective in sorting large volume mail flows, but these systems have limitations. These systems may use either optical character recognition (OCR) technology to recognize the addresses or codes placed on the envelopes, or may use relatively simple scanners to scan a machine readable code such as a bar code which has been recorded or applied to each mail piece. The OCR/CS system often includes a printer for printing bar-code formatted ZIP codes (or similar codes) on envelopes or on labels applied to mail pieces so that each mail piece might be further sorted at local stations more efficiently. Typically, the mail pieces are coded and sorted according to a sort scheme into numerous groups (e.g. a range of ZIP codes, ZIP code (5 digits), ZIP code (9 digits), etc.).

Facilitating the delivery of certain types of mass mailings is the process of presorting. A substantial percentage of the mail the USPS delivers on a regular basis consists of mass mailings. These mass mailings typically consist of advertisements, promotional materials, solicitations, bills and similar materials. Such mailings are printed, addressed or labeled in accordance with a presort scheme to aid in delivery of the mailings and/or presorted in some cases down to the delivery point. The presort scheme is normally by destination address and the mailings are presented to the national postal service accordingly. In many cases, the presort operation includes labeling or addressing the mail pieces with bar coded information such as the ZIP plus four code to facilitate down stream processing. Presort mailing often includes catalogues, brochures, magazines and similar items.

Automated processing of presorted flats, such as magazines and catalogues presents certain mechanical and imaging problems not encountered in connection with automated processing of letters. Although in many cases these mail pieces will have a user-applied postnet bar code, problems are often encountered in locating the coded region of interest (ROI) on the cover of the flat. These problems include poor contrast ratios and partial obscuration due to printed backgrounds, label skew (rotation from horizontal or vertical alignment), and the large amount of printed information which often appears on the covers, including text and other bar codes, which tends to confuse high-speed algorithmic approaches to ROI finding.

A solution for a portion of the mail stream is for the postal service to apply conventional paper labels on which a conventional bar code is then printed, thus ensuring consistent placement and, if necessary, the use of visual keys. However, a large percentage of the volume of flat mail consists of magazines and catalogues for which this is not a good solution.

Publishers of magazines, catalogues, brochures and similar articles intended for mail delivery often spend large sums on the design, layout and content of the covers of such publications in order to achieve the desired visual impact on the recipient. High quality paper, elaborate design, layout and expensive reproduction techniques escalate the cost of catalogues and brochures that may be summarily discarded by the recipient. In many instances, the initial reaction of the recipient to the cover of a catalogue or similar publication will determine whether the recipient keeps the catalogue for further examination or immediately discards it as he or she sorts through that day's mail. If the visual appearance is degraded or the publisher's message is partially obscured by a label, the value of the mailing is reduced. Consequently, there is a great deal of resistance on the part of the distributors of such catalogues and magazines to any printing or labeling of the publications cover that might tend to detract from the cover's appearance and its visual impact on the consumer. Thus, the publishers and distributors of magazines, catalogues and brochures intended for mail delivery generally object to labeling of the cover of these publications with a typical printed stick-on bar coded label of the type used by postal and delivery services to aid in processing and sorting mailed items.

Attempts to use fluorescent inks have met with little success due to problems with long drying times for such inks, smearing of the ink and poor contrast ratios with respect to the underlying substrate. The latter problem is associated with papers having high fluorescence, i.e., recycled papers.

Thus there exists a need for a label and system that allows the use of techniques and processes for automated labeling and identification of articles designed to convey a distinct visual impression. This is particularly true of catalogues, magazines, brochures and similar publications intended for mail delivery where a system and method that allows information to be coded onto the publication with minimal visual impact on the cover of the publication would be highly desirable. The invention addresses this need with a label and labeling system having a minimal optical impact and reading system capable of reliably reading these labels.

SUMMARY OF THE INVENTION

The invention provides a method for identifying articles including labeling the articles with a light polarizing material, the light polarizing material forming a machine readable indicia including a code for automated identification of the article. The light polarizing material is applied over a second, reflective material that reflects light through the light polarizing material to create or form an image from which the machine readable indicia may be reproduced. The image is reproduced by splitting, filtering and transmitting the reflected light to detectors that produce a plurality of electronic images which are compared by subtracting pixels.

In one aspect, the method further includes utilizing a data base including a plurality of codes to apply a different machine readable indicia to different ones of the plurality of articles. Particular articles may be identified in this manner based upon the machine readable indicia applied to the article which corresponds to one of the plurality of identification codes.

In another aspect, a machine readable indicia is formed on a plurality of labels from a light polarizing material applied over a reflective material that reflects light through the light polarizing material that can be filtered to produce a plurality of images. The machine readable indicia is reproducible by electronically comparing the images. The labels are applied to articles thereby enabling automated identification of the articles.

In this respect, automated identification of the articles includes (1) exposing the machine readable indicia to a source of light, (2) dividing light reflected from the indicia into a plurality of beams, (3) filtering each of a plurality of the beams through a polarized filter offset from each of the other filters by a predetermined angle, (4) generating an electronic image from each of the filtered beams with a detector, and (5) comparing at least one of the electronic images to at least one other of the electronic images to reproduce an image corresponding to the indicia. In yet another aspect, the light polarizing material and the reflective material are transparent to visible light to minimize the visual impact of the label on the article.

In yet another aspect, a labeling system according to the invention includes a plurality of labels including a machine readable indicia representing a unique code formed from a light polarizing material and wherein each of the labels includes a reflective layer and a substrate. The system includes a labeler for applying the labels to each of a plurality of articles whereby articles are uniquely identified with one of the codes. The codes are incorporated into database on a computer that represents the plurality of articles and in which the unique code for each of the labeled articles is stored. In one aspect the system includes a media applicator for applying a light polarizing material in a machine readable format to the substrate. Preferably, the applicator is a printer and the light polarizing material is a dichrotic ink.

In yet another aspect, an automated article sorting system according to the invention includes a plurality of polarized lenses for filtering polarized light reflected from a label including machine readable indicia comprising a polarized material on the surface of an article conveyed past the lenses. A detector is provided for each of the lenses to detect reflected light transmitted through the polarized lens, creating an electronic image. The detector sends the signal to a computer that compares the signals from the detectors to reproduce a pattern corresponding to the machine readable indicia. The computer generates a sorting signal corresponding to the indicia that is transmitted to a sorter that sorts the articles based upon the signal received from the computer.

In a preferred embodiment, each of the detectors is a charged coupled array that generates a digitalized electronic image from reflected light passing through one of the filters. Each of the digitalized images are compared by the computer on a pixel-by-pixel to at least one other different digitalized image to reproduce the machine readable indicia.

The invention is particularly applicable to mail piece identification and handling. In this regard, the invention provides a method for identifying a mail piece by applying a machine readable indicia to the mail piece, the indicia including a destination or other code and optionally other printed information. The machine readable indicia is formed from a polarizing material with a reflective layer provided beneath the polarizing material to reflect polarized light back through the indicia, the reflected light comprising a machine detectable pattern including the printed code and/or other information. The method may also include the steps of (a) utilizing a data base including destination codes to apply the machine readable indicia to a plurality of mail pieces (b) preprinting a plurality of labels with a light polarizing material utilizing the database, the labels including a reflective layer for reflecting polarized light and wherein the reflected light comprises a machine detectable pattern corresponding to an entry in the data base and thus inferentially to the destination code of a mail piece.

In this regard, the labels are exposed to a light source and the reflected light is separated with a beam splitter into a plurality of beams. Each of the plurality of beams is directed through a polarized filter and each filter is rotated with respect to each of the other filters by a predetermined angle, for example 60°. A detector such as a charged coupled array is used to generate an electronic image from each of the filtered beams and the electronic images are then compared to each of the other electronic images to isolate the image reflected from the indicia. In mail processing applications, the machine readable indicia may be a bar code such as Post Net code or a similar code including destination information for the mail piece. The system may also utilize materials which function as indicated only in infra-red or ultra-violet light so that the indicia and/or the substrate may be transparent to visible light, further reducing the visual impact of the indicia relative to the cover of the mail piece.

In yet another aspect, the invention provides a mail processing system comprising a computer including a database of destination codes corresponding to a plurality of mail pieces for delivery to at least some of the destination codes. A media applicator coupled to the computer utilizes the database for generating machine readable indicia in the form of a light polarizing material, including the destination code for each of the plurality of mail pieces. The media applicator may be a printer wherein the machine readable indicia is imprinted with a dichroic ink on a label. The indicia may be also preprinted on labels which are then applied to the mail pieces with a label applicator. Alternatively, the label may be applied to the mail piece prior to printing.

The invention also provides a mail sorting system including a plurality of polarized lenses for filtering polarized light reflected from a machine readable indicia formed from a light polarizing material. A detector, such as a charge coupled array, is associated with each of the lenses for detecting reflected light and generating a signal in response thereto. The signal is an electronic image of the mail piece using a selected bandwidth of light as viewed through the associated polarizing filter in the form of digitized electronic pixels. The signals from the charge coupled array are transmitted to a computer which compares the electronic images to detect a pattern corresponding to the machine readable indicia. In one embodiment, the computer creates three different images by subtracting the electronic pixels forming each image from the electronic pixels forming each of the other images. The clearest differential image may then be selected. Based upon the image of the indicia produced by the subtraction, the computer then generates a sorting signal corresponding to the indicia which is transmitted to a mail sorter where the mail pieces are sorted based upon the information contained in the indicia, for example, by destination code.

These and other advantages and features of the invention will be readily apparent from the following Detailed Description and Drawings.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1(*a*) is a cross section view of the mail piece and label of FIG. 1 taken along lines a—a of FIG. 1;

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention. In particular, while the invention is described in the context of mail piece identification and processing, it will be appreciated that the method and system described herein may be utilized in numerous other applications where it is desired to label items for the purposed of identification with minimal impact on the appearance of the article.

Sunlight and most forms of artificial light are electromagnetic waves whose electric field vectors vibrate in all perpendicular planes containing or orthogonal to the vector which indicates the direction of propagation. When the electric field vectors of such radiation are restrained to a single plane, the light is said to be polarized relative to the direction of propagation and the electric field waves vibrate in the same plane. Light may be polarized to a certain degree when it is reflected from a surface such as water or a highway. In this case, light waves that have electric field vectors parallel to the reflecting surface are reflected to a greater degree than those with different orientations. Light may also be polarized through the use of certain filters. In one aspect, the invention takes advantage of the properties of light, in particular polarization, to provide a label and system for coding mail pieces and in particular pieces such as magazines, catalogues, brochures and similar items with a machine-readable code in a form that minimizes the visual impact of the label on the appearance of the cover of the publication.

Figure 1:
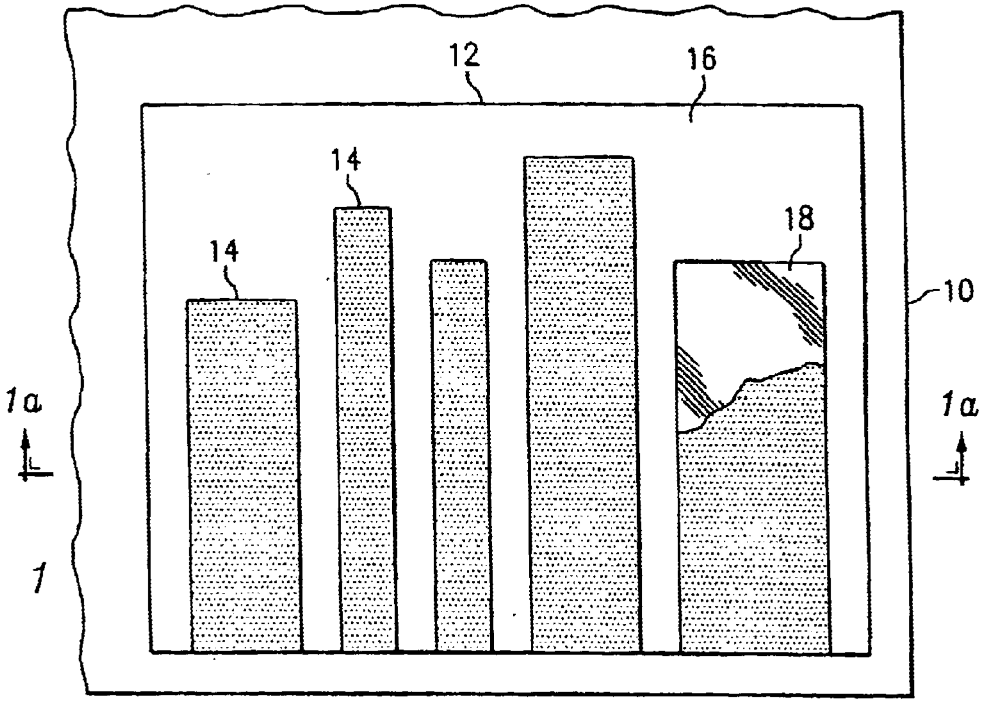
FIG. 1 is a top view of a mail piece bearing a label in accordance with the invention including machine readable indicia in the form of a bar code.

Referring now to FIGS. 1 and 1(*a*) there is illustrated a portion of a mail piece 10 such as a catalogue or magazine cover with a label 12 according to the invention applied thereto. In one embodiment, the label is formed from a non-opaque material such as a transparent polymer. Preferably, the label is formed from an oriented film such that a dichroic ink will form a polarized image on or in the film. "Dichroic" as used herein refers to the characteristic of differential absorption of incident radiation in the visual, UV, and IR spectrum depending upon the direction of vibration of the electromagnetic waves comprising the radiation. A "Dichroic ink" refers to an ink containing a dye or stain having molecules that tend to align with the molecules of a substrate, such as an oriented film, resulting in a substrate that will selectively absorb differently polarized components of an incident light beam. Such inks and techniques for applying such inks are known, for example U.S. Pat. No. 6,013,123 issued Jan. 11, 2000 to Scarpetti for "Inking Methods and Compositions for Production of Digitized Stereoscopic Polarizing Images" discusses the use and application of inks containing a dichroic dye, water and a humectant. Also, as used herein the term "light" encompasses radiation in the visible spectrum ("visible light") as well as non-visible UV and IR radiation.

As illustrated the label comprises a machine-readable indicia 14, in this case a bar code printed with a dichroic ink. Alternatively, the portion 16 of the label 12 excluding bar code 14 may be printed with a dichroic ink, leaving the bar code as an unpolarized area. Positioned between label 12 and indicia 14 is a reflective layer 18 which as illustrated is coextensive with indicia 14 or, alternatively, with the larger surface 16.

The purpose of reflective layer 18 is to reflect incident light so as to provide sufficient contrast for the machine readable indicia 14. The degree of opaqueness of reflective layer 18 is preferably maintained at a level sufficient to reflect enough light to contrast bar code 14 for the purpose of scanning as hereinafter described, while transmitting as much light as possible to minimize the visual impact of the label. Depending upon the particular application, reflective layer 18 may be formed from a number of known materials capable of reflecting light in the spectrum of interest, including light in the visible spectrum, infrared or near infrared and ultraviolet. For example, the reflective layer may be a plastic film including one or more additives that modify the optical properties of the film such that the desired spectrum is reflected from the film. In other applications, a metalized layer formed with known methods of applying an extremely thin layer of metal to a substrate such as plastic may be used. A metalized layer would be particularly suitable for labeling gift and decorative items covered with a metallic foil or where a metallic foil is used to protect an item from sunlight. In other applications the reflective layer may be silica or a similar material incorporated into a plastic film.

In one preferred embodiment, reflective layer 18 is partially transparent to visible light, thereby minimizing the visual impact of the label. The term "partially transparent" as used herein refers to the capability of a material to pass sufficient visible light to enable normal visual recognition of an underlying image. Thus, "partially transparent" may encompass materials allowing differing degrees of light transmission depending upon the particular application. While a translucent or partially transparent reflective layer 18 is preferable, it is not required for all applications. In some applications it may be desirable for reflective layer 18 to be opaque and colored to match an underlying surface and/or be coextensive with the entire area of label 12.

In one preferred embodiment, label 12 is formed from an oriented transparent plastic film with a transparent or translucent reflective layer 18 printed or applied to the label 12. Machine readable indicia 14 is formed from a dichroic dye which is preferable fully transparent to visible light and constitutes a polarizing filter in the UV or IR wavelengths of light. In this case, the reflective layer 18 is formed from a material that is transparent to light in the visible spectrum ("visible light") while reflecting light in the non-visible UV or IR spectrum. In this embodiment the visual impact of the label 12 upon the overall appearance of the labeled article is minimized.

Figure 1A:
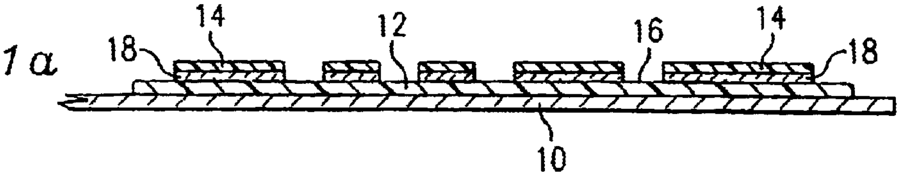
Figure 2:
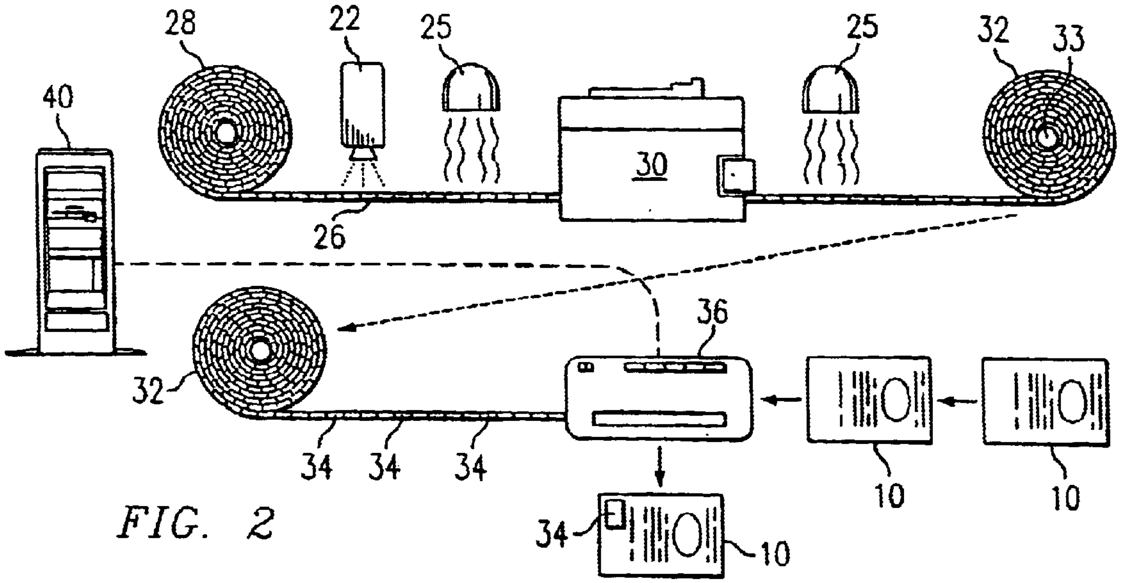
FIG. 2 is a schematic diagram of a system for identifying mail pieces utilizing one embodiment of a method of the invention.

Referring now to FIG. 2, an apparatus 20 for preparing and applying labels according to the invention includes an applicator 22 which applies a reflective layer 18 (FIGS. 1 and 1*a*) onto an oriented film 26 fed from roll 28. In one embodiment, film 26 has been perforated along lines defining individual labels and an adhesive coating or layer has been applied to one side of the film for adhering the labels to an item or article to be labeled. After reflective layer 18 has been applied to the film, the film is then conveyed through a printer 30 that applies a bar code or other machine readable indicia 14 (FIGS. 1 and 1*a*) representing a unique numeric or alpha numeric code to the label using a dichrotic ink. One or more heaters 25 may be used to dry or cure the reflective layer as well as the ink. Heaters 25 may be forced air or radiant heaters depending upon the particular design and application. After printing and curing, the preprinted labels are re-wound into a roll 32 on winder 33 for subsequent use.

Film 26 comprising preprinted labels 34 is fed to a labeling machine 36 from roll 32 along with a singulated stream of mail pieces 10. Destination information for each of mail pieces 10 has been acquired by reference to a mailing list for the mail pieces, scanning the mail pieces for previously applied destination information, manual input of destination information or a combination of thereof and stored on computer 40. The codes previously applied to labels 34 have also been transferred to and stored on computer 40. As the mail pieces 10 are fed through labeling machine 36 a label having a unique code as previously described is applied to the mail piece and the code is associated with the record stored in computer 40 for that particular mail piece. Thus, the mail pieces can subsequently be identified, sorted and processed using the code imprinted on labels 34 along with the record of the mail piece stored on computer 40. As will be appreciated, in this respect the invention may be particularly advantageous for use by mailers and/or presorters of magazines, brochures, catalogues and similar items having covers designed to convey a distinct visual impact.

Figure 3:
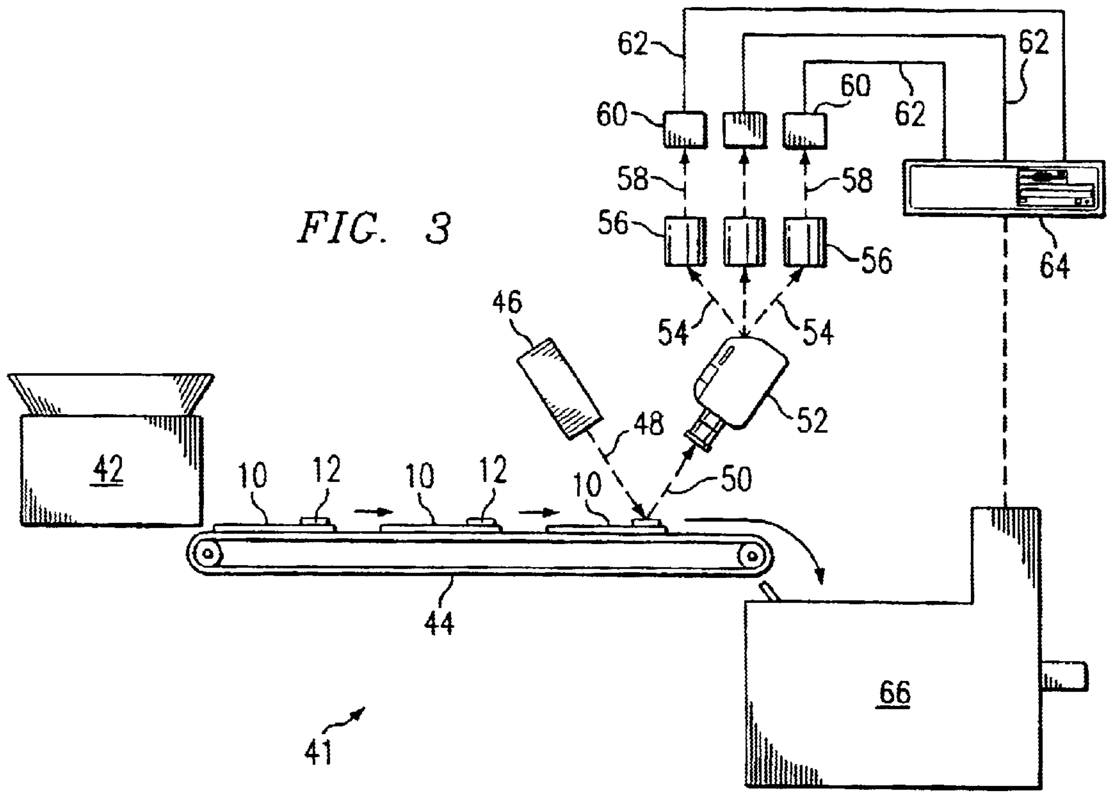
FIG. 3 is a schematic of a system for sorting mail pieces utilizing the label and method of the invention.

Turning now to FIG. 3, a sorting apparatus 41 for scanning and sorting mail pieces labeled as described above is illustrated. A stream of singulated mail pieces is fed from feeder 42 to conveyor 44 for processing in accordance with the invention. The location of the mail pieces on the conveyor may be monitored with one or more photocells (not shown) or by other conventional means so as to produce a signal for transmission to computer 40 for use in further processing of the mail stream. Additionally, an edger (not shown) may be incorporated into the apparatus 41 to ensure proper placement of the mail piece to enable scanning as hereinafter described.

Singulated mail pieces 10 pass under light source 46 which directs a beam 48 of non-polarized visible or invisible, e.g., near-infrared light onto the mail piece 10. Depending upon the reflective nature of the substrate, the illumination is chosen to be diffuse or beamed. Reflected light 50 from the mail piece 10 travels to camera 52 which includes one or more dividers such as beam splitters to generate three machine detectable beams 54 which are each directed to polarized filters 56. The axis of each of polarized filters 56 is rotated sixty degrees (60°) relative to the axes of each of the other filters. The filtered beams 58 are directed to impinge upon a detector 60 such as a charge coupled array (CCD). Each of the charge coupled arrays generates a digitized electrical image of the mail piece 10 from the filtered beam 58 and transmits the electronic image 62 to a computer 64.

Computer 64 receives the electronic images 62 from each of the charge coupled arrays and compares the images. In one embodiment, computer 64 compares the images 62 by subtracting one image from another on a pixel-by-pixel basis. Ideally, when an unpolarized image is subtracted from another un-polarized image of the same subject, the resulting image will be completely black. Thus, when an unlabeled mail piece passes under the camera or scanner 52 the resultant electronic images 62 are all identical and the resulting combined electronic images will be entirely black.

However, when a mail piece bearing a label according to the invention passes under the scanner 52, the image of the polarized area of the label 12, as observed via filtered beams 58, will depend upon the alignment of the polarized portion or indicia 14 with respect to the axis of each of the polarized filters 56. Computer 64 will therefore generate up to three images from the three electronic images 62 in which the polarized portion of the label 12 will appear white or nearly white, while the remainder of the image will be black. Computer 64 may be programmed to select the better images, combine images or other wise manipulate the images to create a high-contrast image.

After computer 64 has subtracted the digitalized images, the result is an image in which the barcode or indicia 14 will appear white against a black background. In practice, minor misalignments and variations due to the application procedure, focusing and camera element alignment are observed. However, the high contrast white image against the background of black is sufficient to overcome such variations for the purpose of reading the indicia. Once the machine readable indicia 14 has been isolated as set forth above, the computer 64 may electronically scan or process the indicia using known techniques and read the printed code 14 for the particular mail piece 10. Computer 64 then uses this information and a data base associating this code with a destination to send a sorting signal or information corresponding to the mail piece to a down stream conventional mail sorter or sorting equipment 66, where the mail pieces 10 may be sorted by destination code or other criteria, with or without mail pieces originating from other sources, depending upon the particular application.

Figure 4:
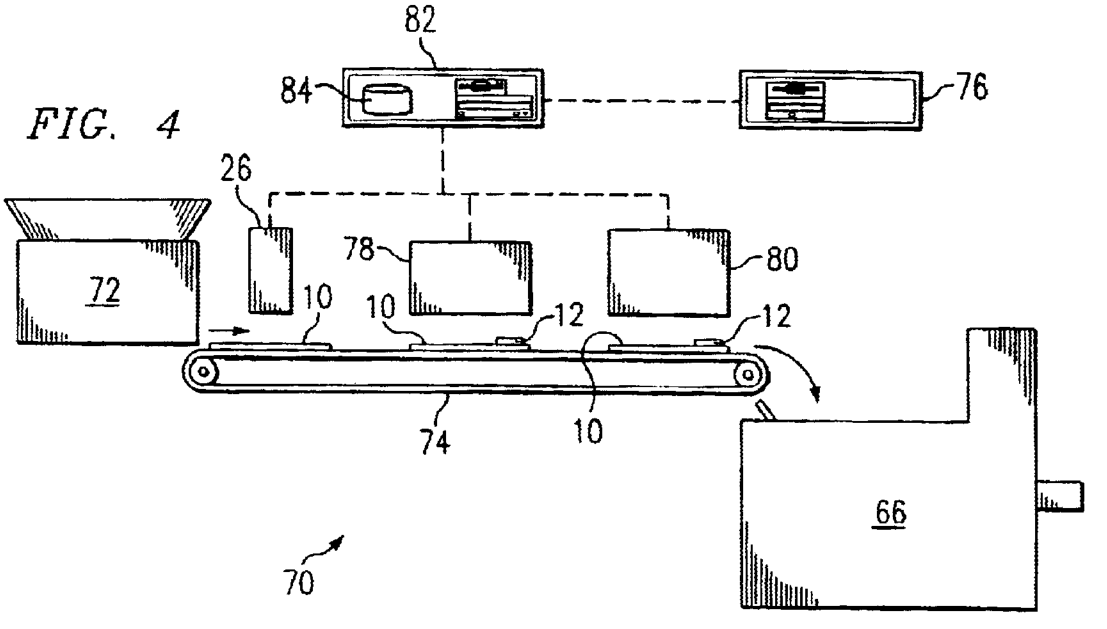
FIG. 4 is a schematic diagram of an alternate system for identifying mail pieces according to the invention.

Referring now to FIG. 4, there is illustrated an alternate system 70 for applying labels in accordance with a method of the invention to a plurality of mail pieces such as magazines, brochures or catalogues. Feeder 72 feeds a stream of singulated mail pieces 10 onto conveyor 74. The location of the mail pieces on the conveyor may be monitored with one or more photocells (not shown) or by other conventional means so as to produce a signal for transmission to computer 76 which controls the process. A label applicator 78 applies a label, for example a piece of oriented transparent polymer film with a pre-applied adhesive, to each of the mail pieces 10 as the mail pieces are conveyed though the system 70. In order to ensure placement of the label in the desired position, the mail piece may be edged, as is known in the art with an edger (not shown). As the mail pieces travel down the conveyor 74, a reflective layer 18 (FIGS. 1 and 2) is applied to the label, by for example, printing the layer 18 onto the label with a first media applicator 78. As will be appreciated, the reflective layer 18 could have been previously applied to the label film, in which case, this operation could be eliminated.

As the mail pieces travel further, a second media applicator 80 applies a machine readable indicia 14 (FIGS. 1 and 2), by, for example, printing the indicia 14 over the reflective layer 18 with a dichroic ink. The machine readable indicia may include a destination code for the particular mail piece or some other code, symbols, or text to be used in subsequent handling or processing. A computer 82, including a database 84 controls the operation of the second media applicator 80, suppling the destination code from data, for example, a mailing list, stored in database 84. In an alternative embodiment, second media applicator 80 may comprise a laser or UV light source, the light source imprinting a polarized or non-polarized indicia on a pre-sensitized or treated film label. In the case of a pre-sensitized polarized film, the light source may depolarize an area of the label corresponding to a machine readable indicia. In the alternative, the pre-treatment of the film may allow the laser to selectively polarize areas of the label corresponding to a desired indicia.

Following application of a machine readable indicia 14 upon the label 12, the mail pieces 10 are transported for further processing, for example stacking and bundling with stacker 66. The labeled mail pieces may then be transported to a postal service sorting system which may use a scanning apparatus of the type described herein to readily sort the mail pieces 10 for delivery based upon the destination code printed on the label.

As will be appreciated, numerous variations and permutations of the above-described process may prove advantageous. In the case where the address of the recipient is printed upon the mail piece, and an optical character scanner (OCR) may be used to read the information which could then be transmitted to the computer 82 for labeling purposes. It is also anticipated that the reflective layer could be pre-applied to the label film, or during production of the film.

As will be appreciated, variations on the above system may be readily discerned. For example while the system is described as having a light divider that directs beams to a plurality of filters, multiple cameras may be used with different filters and filter configurations to produce the same result. Similarly purpose-built electronics and/or multiple computers or microprocessors may be employed to perform the various functions described above. These and other combinations and permutations are within the scope of the invention.

Figure 5:
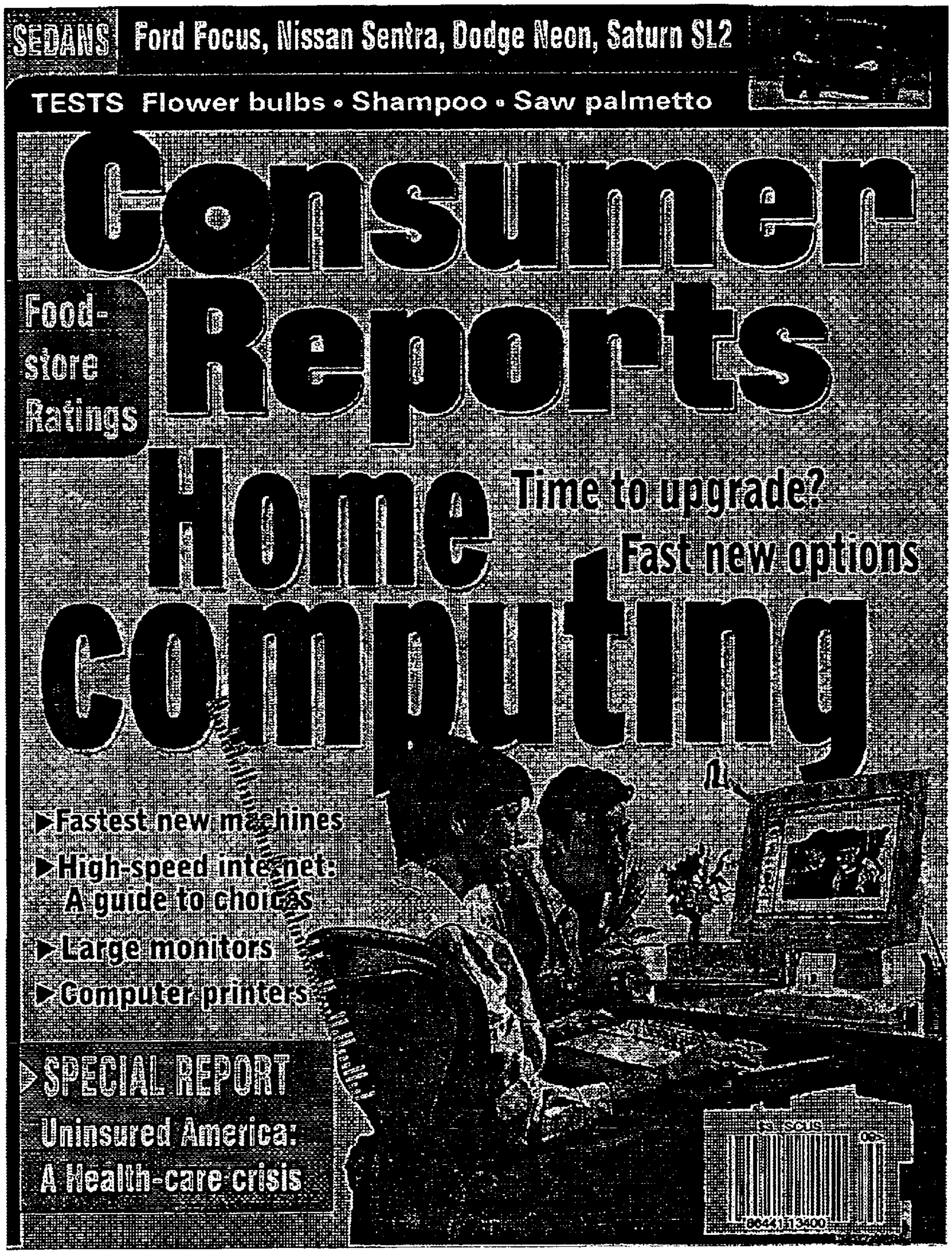
FIGS. 5 is an illustration of a magazine cover bearing a label of the type of the invention.
Figure 6A:
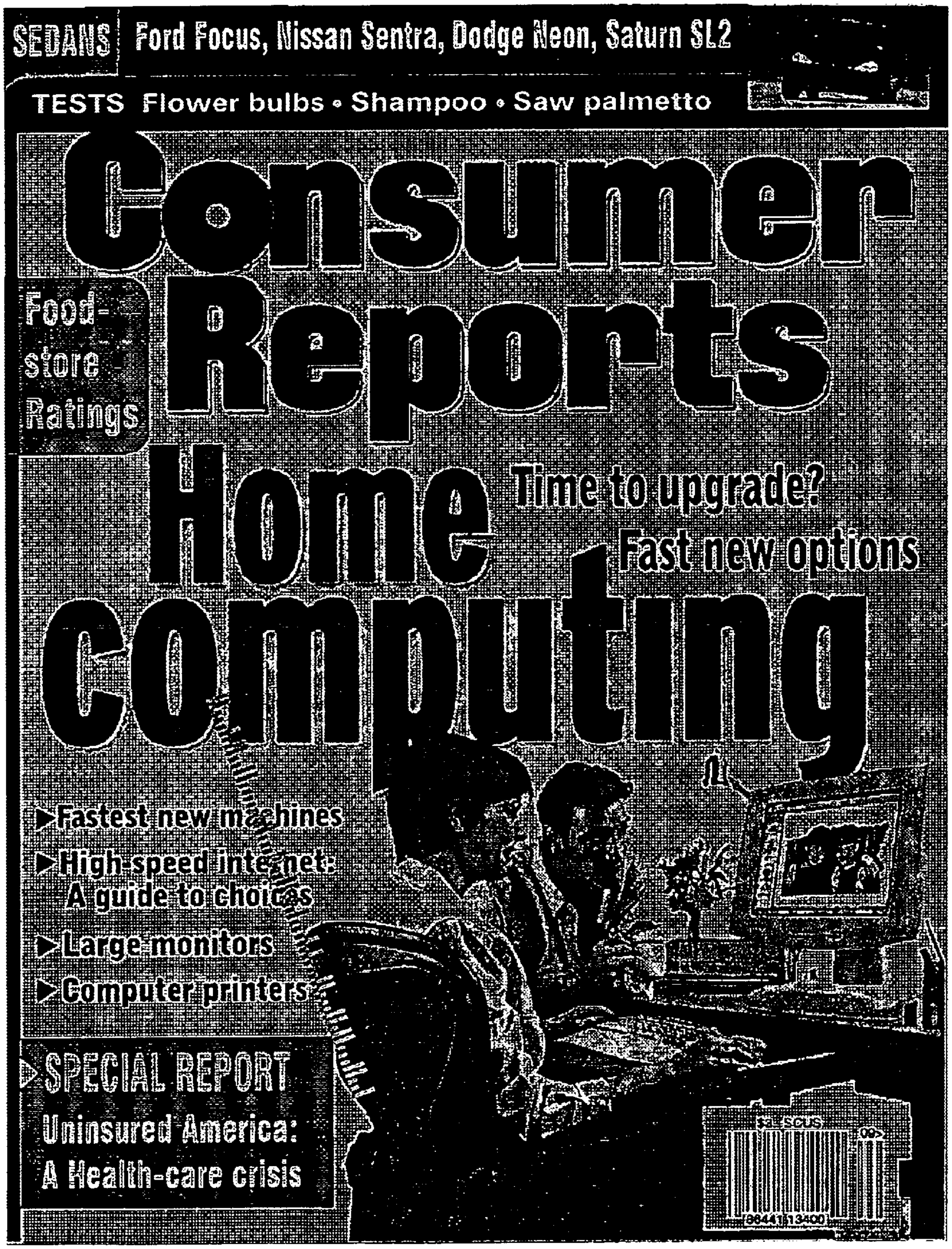
FIGS. 6*a*–6*c* illustrate images of the magazine cover formed from light reflected from the cover and filtered through polarizing filters.
Figure 6B:
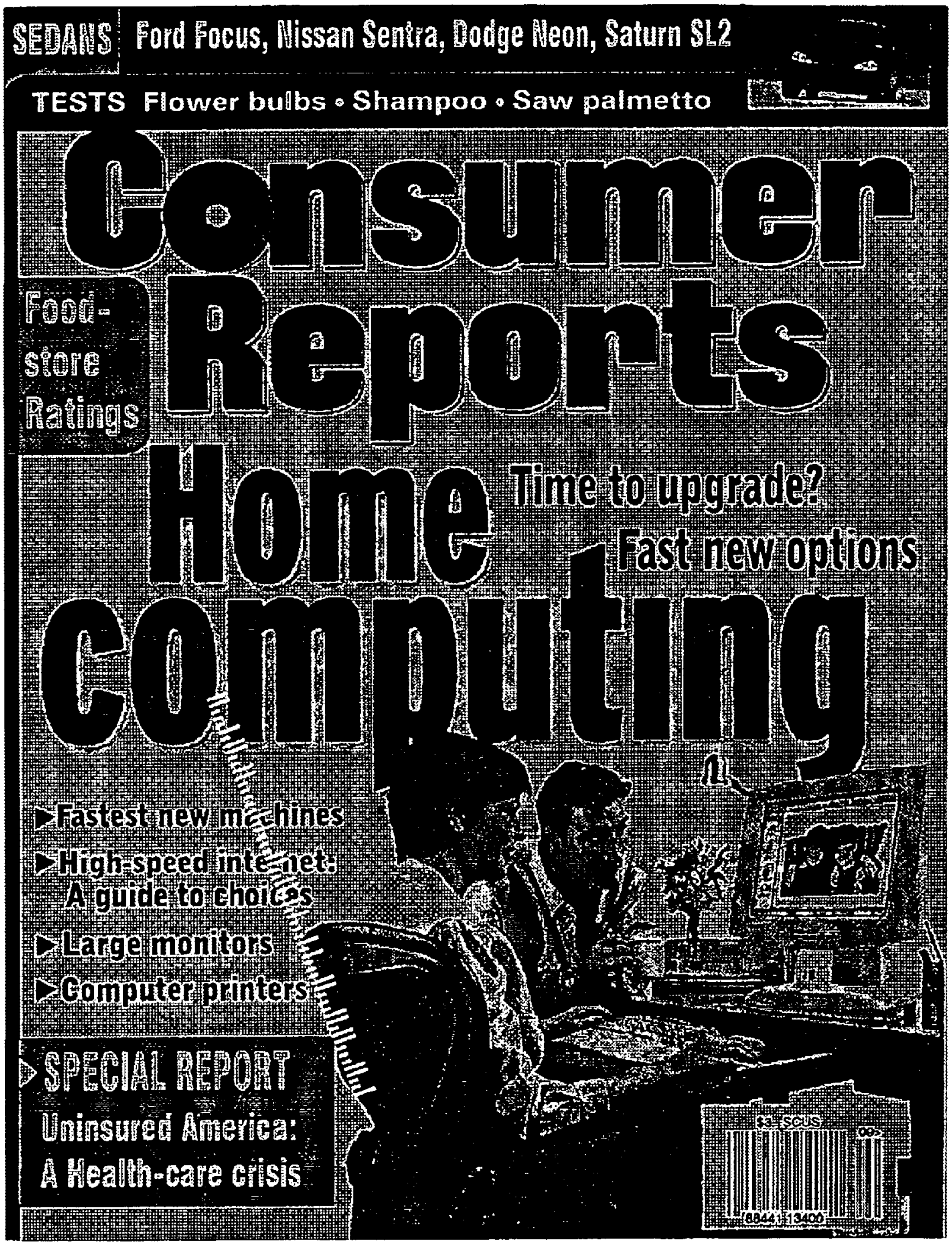
Figure 6C:
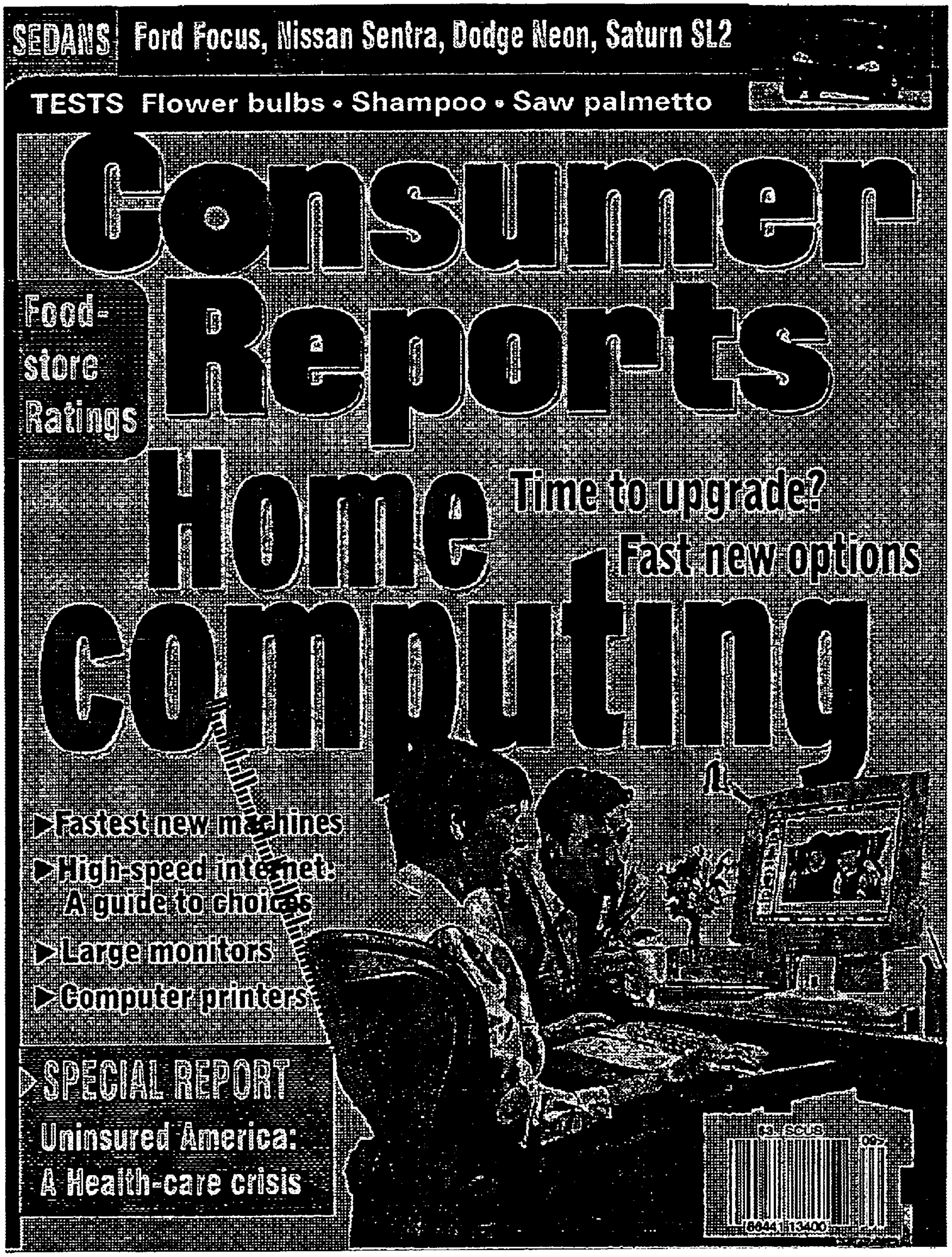
Figure 7A:
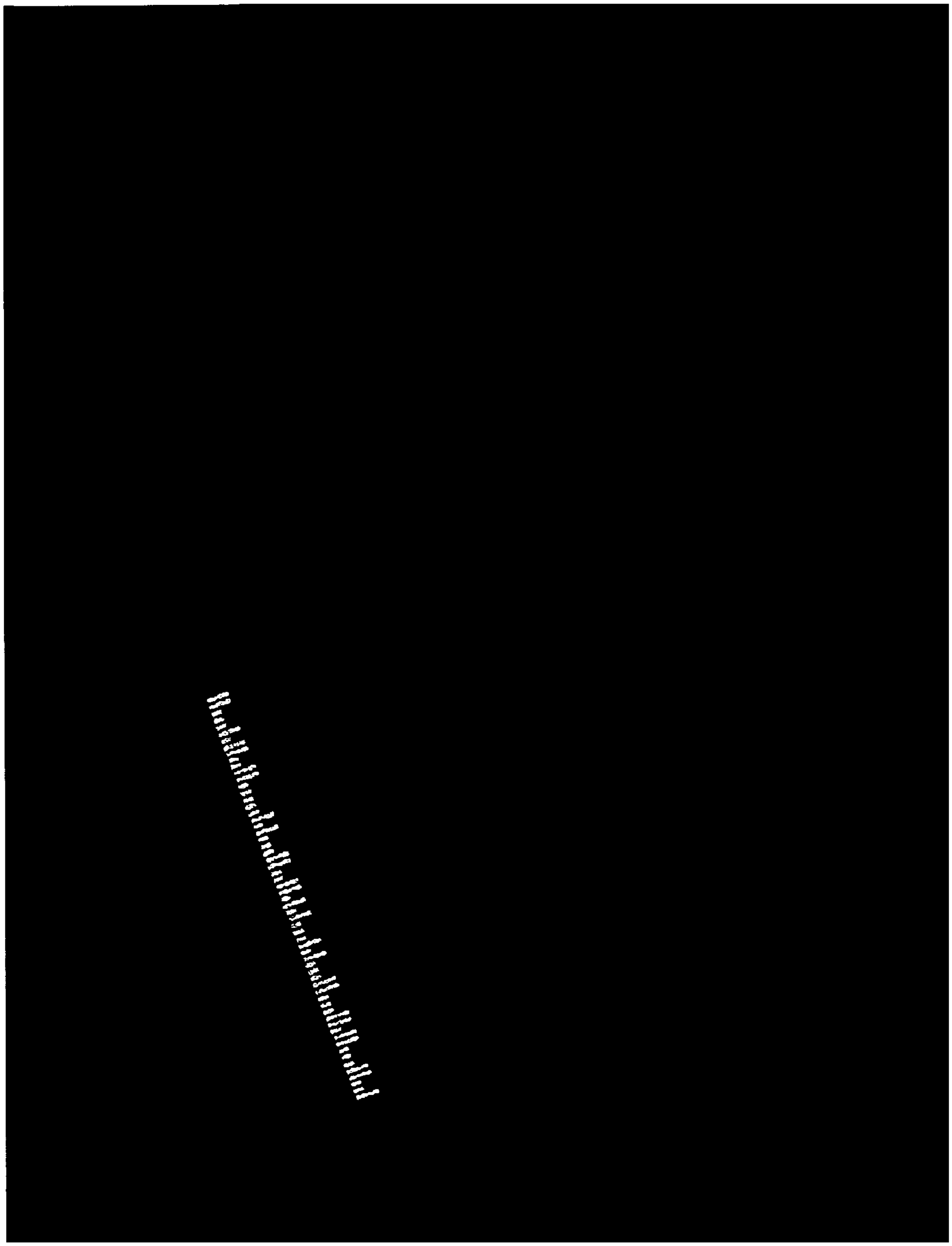
FIGS. 7*a*–7*c* illustrate images formed by comparing electronic images corresponding to FIGS. 6*a*–6*c* and subtracting pixels of the images.
Figure 7B:
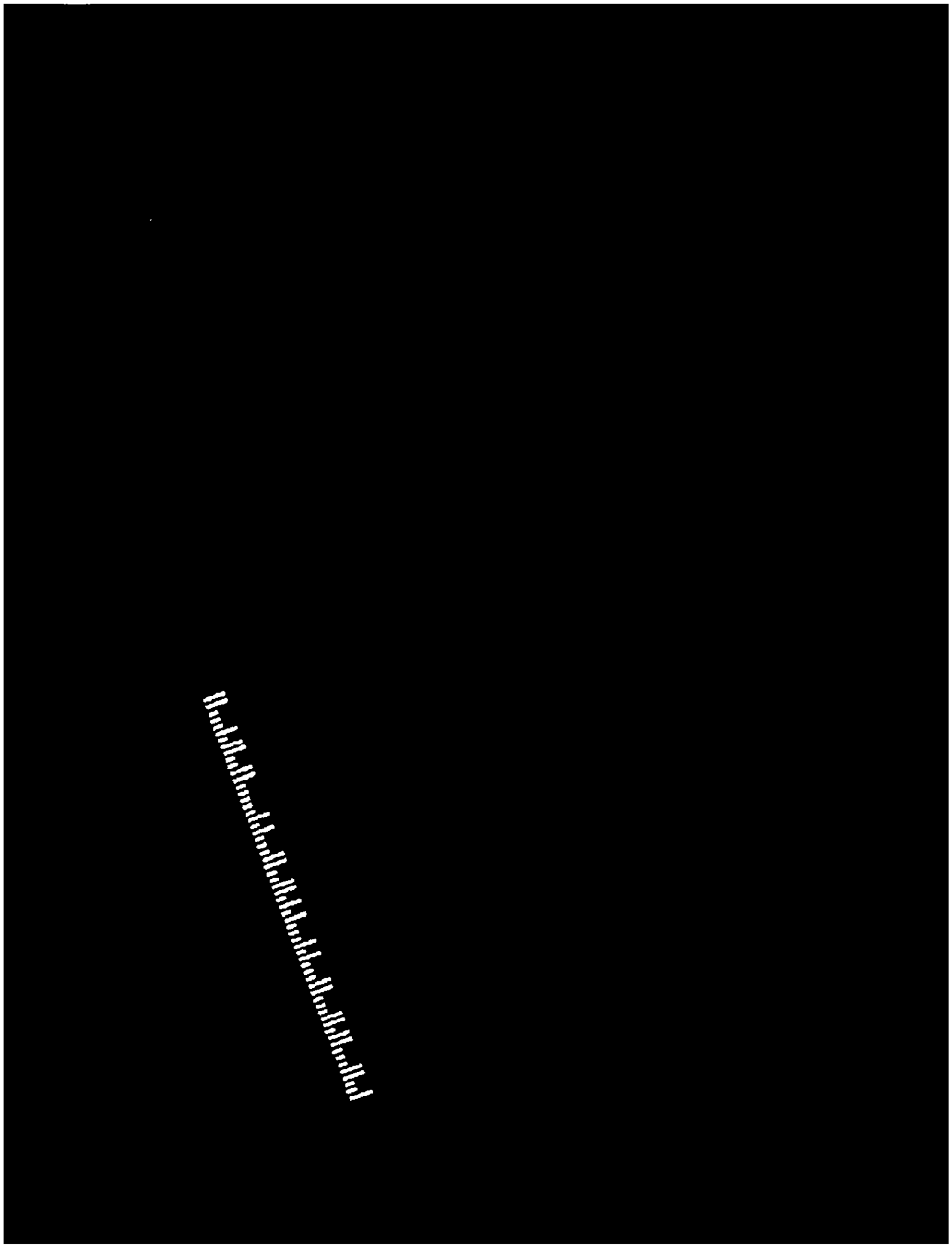
Figure 7C:
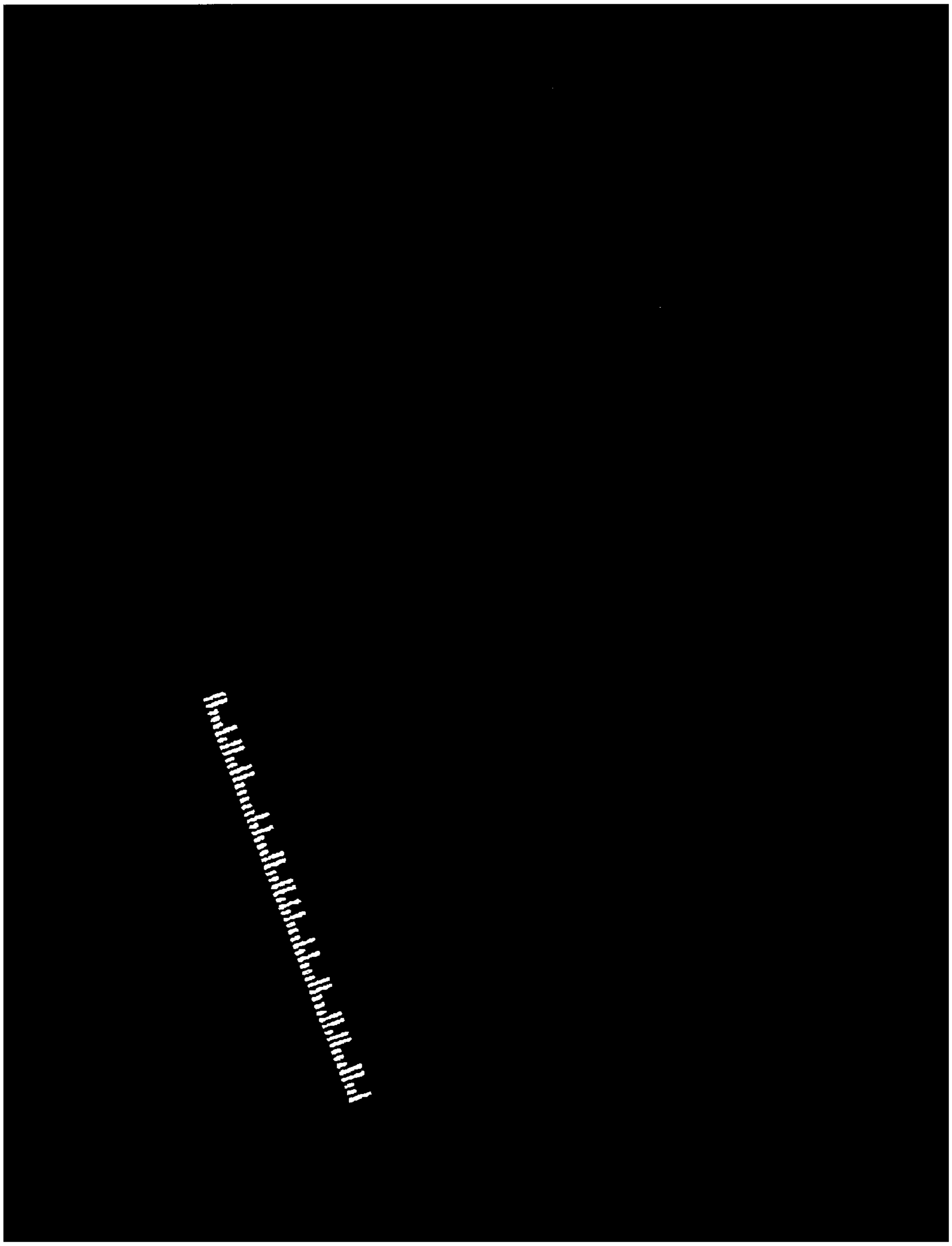

In order to fully illustrate the principles of the invention, reference is now made to FIGS. 5–11. Turning first to FIG. 5 there is shown the cover of a popular magazine as would be perceived by the human eye, including label 12. FIGS. 6*a*, 6*b* and 6*c* correspond to the images as the images are captured by each of three 2048 pixel (from left to right) charge coupled arrays. As shown, the images are nearly identical except that the image of the bar code varies in brightness between the images. FIGS. 7*a*, 7*b* and 7*c* are the result of digitally subtracting each of the images of FIGS. 6*a*, 6*b* and 6*c* from each other, i.e., 6*a*–6*b*, 6*a*–6*c* and 6*b*–6*c*. In each of the images presented in FIGS. 7*a*–7*c*, the only non-black portion of the image is the bar code and the brightness of the code in each of the images is a function of the brightness of the images in the particular pair of subtracted images. In operation, it is anticipated that all three images will be generated with one being selected for reading based upon its relative brightness.

Figure 8:
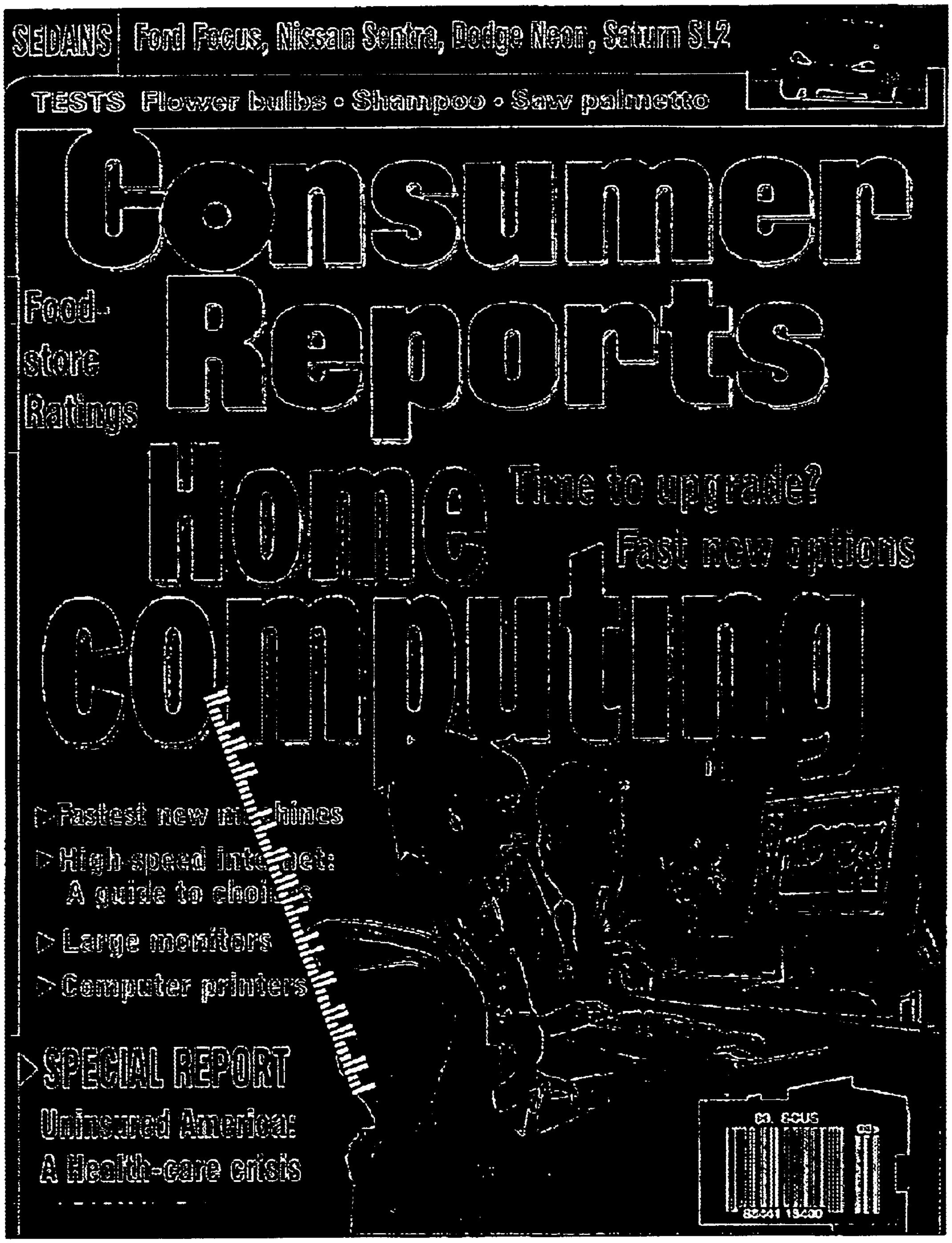
FIGS. 8–11 illustrate images of the magazine cover as filtered and compared in which the effect of variations in parameters are shown.
Figure 9:
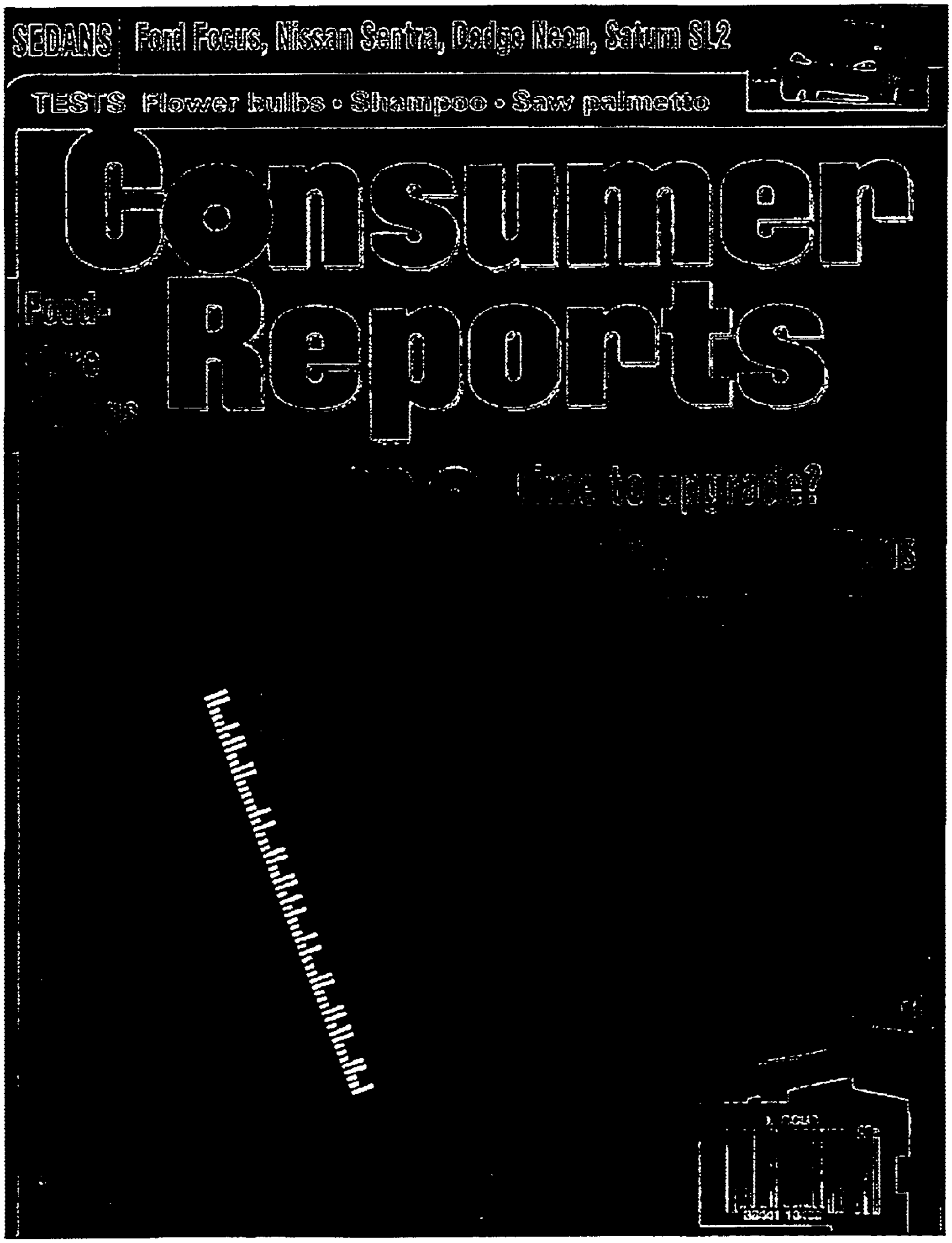
Figure 10:
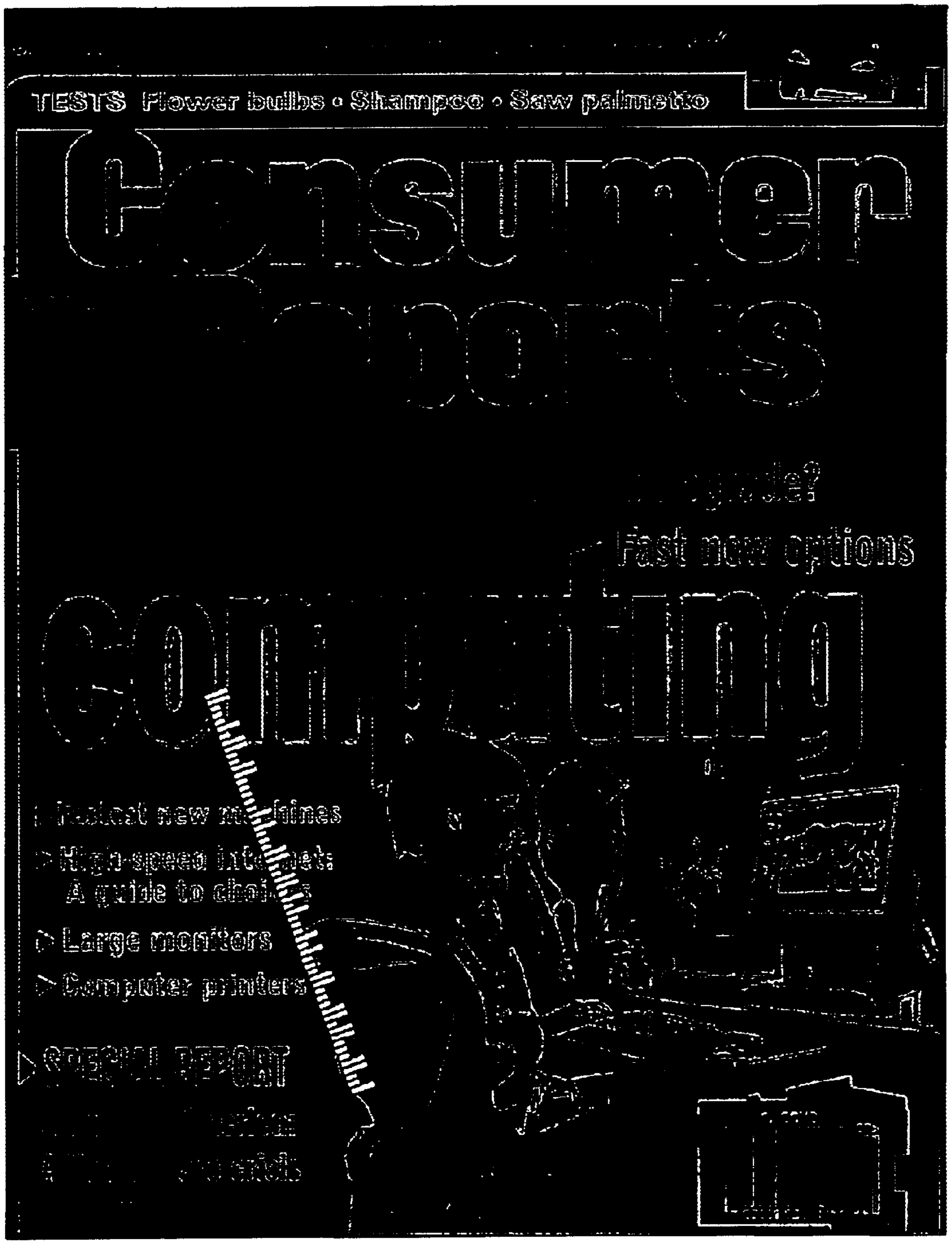
Figure 11:
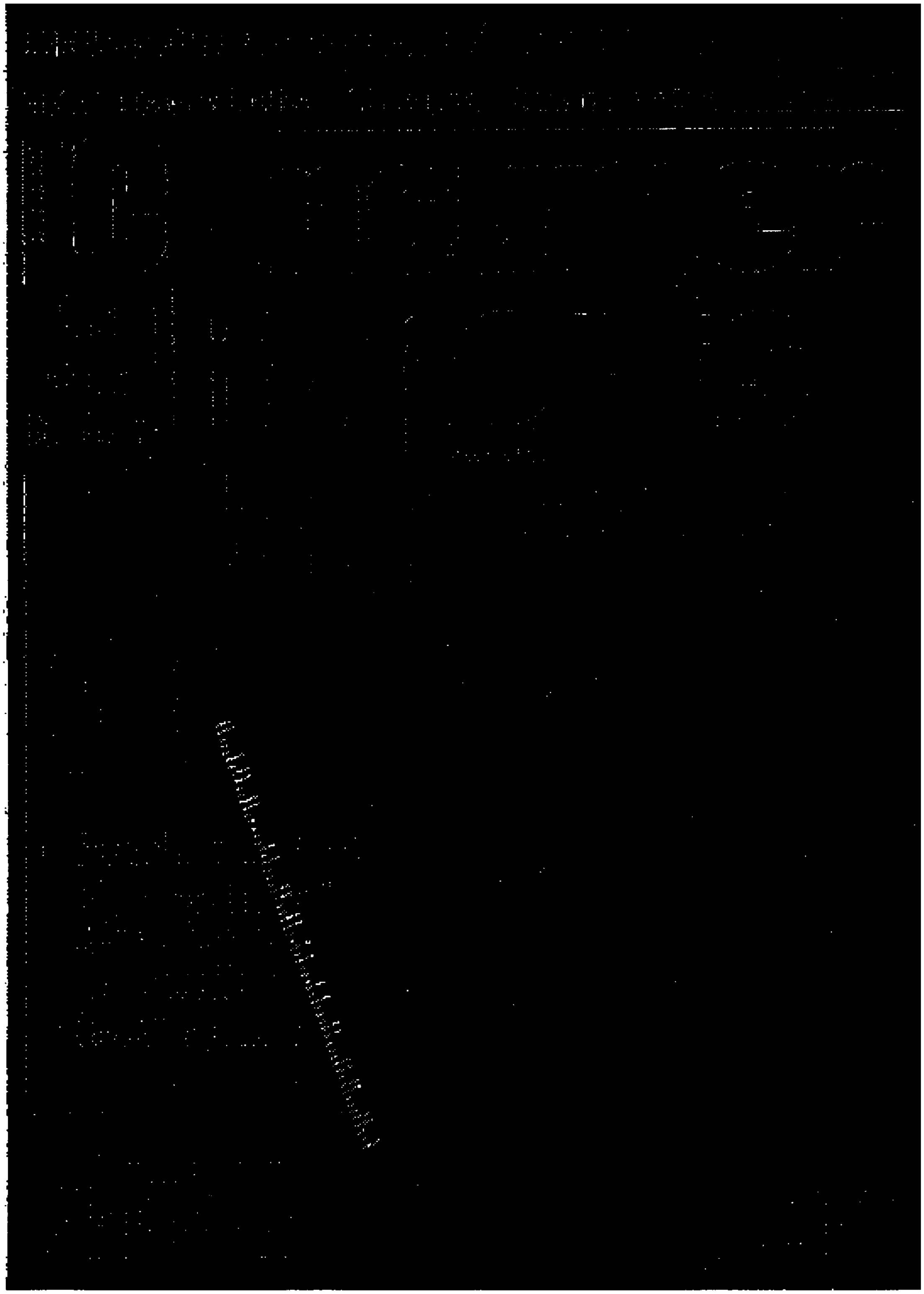

FIGS. 8–11 illustrate anticipated deviations from the ideal. FIG. 8 shows the effect of a one-pixel shift horizontally combined with a one-pixel shift vertically to simulate the translational misalignment of two charge coupled arrays. FIG. 9 illustrates the anticipated effect of a small rotational misalignment with the arc of the misalignment corresponding to a shift of one pixel at a corner of the image. FIG. 10 shows the anticipated effect of a possible scaling error resulting from one of the charged coupled arrays observing a slightly larger image, i.e., 2 pixels along the horizontal axis, than observed by the other charge coupled arrays. FIG. 11 illustrates the image resulting from a combination of the misalignments shown in FIGS. 8–10. As illustrated, while some of the background is not entirely black, the degree of contrast is still sufficient to enable scanning and reading the label. Thus, the label and system of the invention are capable of tolerating minor variations that may be encountered in manufacturing, imprinting and scanning operations without affecting the operation of the system.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

What is claimed is:

1. A method for scanning articles each labeled with a label comprising a light polarizing material, comprising the steps of:

- exposing the light polarizing material to a light source, the light polarizing material being positioned over a reflective layer to form a machine readable indicia including a code associated with the article;
- dividing light reflected from the indicia into a plurality of beams;
- filtering at least a plurality of the beams through polarizing filters, each of the filters being offset from each of the other filters by a predetermined angle;
- generating an electronic image from each of the filtered beams with a detector;
- comparing the electronic images to produce a composite image corresponding to the machine readable indicia; and
- electronically analyzing the composite image to decode the indicia.

2. The method of claim 1 wherein the machine readable indicia are formed on a plurality of labels from a light polarizing material applied over the reflective material, the reflective material reflecting light through the light polarizing material.

3. The method of claim 1 further comprising generating the electronic image from each of the filtered beams with a charge coupled array.

4. The method of claim 1 wherein the light polarizing material and the reflective material are transparent to visible light.

5. The method of claim 1 wherein the machine readable indicia comprise postal address information and the articles comprise mail pieces.

6. The method of claim 1 wherein the label is at least partially transparent, and the reflective material comprises a surface of a labeled article.

7. The method of claim 1 wherein a database including a plurality of codes is used to apply different machine readable indicia to different ones of the plurality of articles, the machine readable indicia representing one of the plurality of codes associated with particular articles.

8. The method of claim 7 wherein the machine readable indicia comprises a bar code.

9. A method for scanning destination information from a series of mail pieces, each mail piece being labeled with a bar code formed from a light polarizing material, the method comprising:

exposing the mail piece to a light source, such that light is reflected through the bar code from a reflective layer under the bar code;

dividing the reflected light into a plurality of beams;

filtering at least a plurality of the beams through polarizing filters, each of the filters being offset from each of the other filters by a predetermined angle;

generating an electronic image from each of the filtered beams with a detector;

comparing the electronic images to produce an image of the bar code; and electronically analyzing the composite image to decode the bar code.

10. A method for scanning articles each labeled with a label including a light polarizing material, comprising the steps of:

conveying the articles past a light source to expose the light polarizing material to light, the light polarizing material being positioned over a reflective layer to form a machine readable indicia including a code associated with the article;

dividing light reflected from the indicia into a plurality of beams;

filtering at least a plurality of the beams through polarizing filters, each of the filters being offset from each of the other filters by a predetermined angle;

generating an electronic image from each of the filtered beams with a detector;

subtracting a first digitalized image from a second digitalized image to obtain a difference representing the machine readable indicia; and electronically analyzing the composite image to decode the indicia.

11. The method of claim 10 further comprising generating the electronic image from each of the filtered beams with a charge coupled array.

12. The method of claim 10 wherein the machine readable indicia comprises a bar code.

13. The method of claim 10 wherein the light polarizing material and the reflective material are transparent to visible light.

14. The method of claim 10 wherein the machine readable indicia comprise postal address information and the articles comprise mail pieces.

15. The method of claim 10 wherein the label is at least partially transparent, and the reflective material comprises a surface of a labeled article.

* * * * *